(12) United States Patent
Kluge (10) Patent No.: US 10,371,540 B2
(45) Date of Patent: Aug. 6, 2019

(54) PROVIDING A NAVIGATION SYSTEM WITH NAVIGABLE ROUTES (71) Applicant: Harman Becker Automotive Systems, GmbH, Karlsbad-Ittersbach (DE)

(72) Inventor: Sebastian Kluge, München (DE)

(73) Assignee: Harman Becker Automotive Systems GmbH, Karlsad-Ittersbach (DE)

( * ) Notice: Subject to any disclaimer, the term of this patent is extended or adjusted under 35 U.S.C. 154(b) by 0 days.

(21) Appl. No.: 15/746,612

(22) PCT Filed: Jul. 23, 2015

(86) PCT No.: PCT/EP2015/066886
§ 371 (c)(1),
(2) Date: Jan. 22, 2018

(87) PCT Pub. No.: WO2017/012672
PCT Pub. Date: Jan. 26, 2017

(65) Prior Publication Data
US 2018/0216949 A1   Aug. 2, 2018

(51) Int. Cl.
*G01C 21/34* (2006.01)
*G08G 1/0968* (2006.01)

(52) U.S. Cl.
CPC ..... *G01C 21/3461* (2013.01); *G01C 21/3446* (2013.01); *G08G 1/096816* (2013.01)

(58) Field of Classification Search
None
See application file for complete search history.

(56) References Cited

U.S. PATENT DOCUMENTS

2016/0187148 A1* 6/2016 Unger ................ G01C 21/3423
                                                              701/400
2016/0370193 A1* 12/2016 Maischberger ........ G01C 21/34

FOREIGN PATENT DOCUMENTS

EP          1398599 A1    3/2004
WO      WO2011160687 A1   12/2011

* cited by examiner

*Primary Examiner* — Richard M Camby
(74) *Attorney, Agent, or Firm* — Angela M. Brunetti (57) ABSTRACT

A system and method of providing a route to a navigation system including calculating the route from road data including road segments, determining decision points on the route, wherein at least two road segments are connected to each other at each of the decision points, storing data of the determined decision points in a memory and encoding the route based on the stored data of the determined decision points.

12 Claims, 5 Drawing Sheets

PROVIDING A NAVIGATION SYSTEM WITH NAVIGABLE ROUTES

FIELD OF INVENTION

The present invention relates to route guidance by a navigation system and a navigation system for a vehicle. In particular, it relates to the provision of navigable routes to an in-vehicle navigation system.

BACKGROUND OF THE INVENTION

Nowadays navigation systems have become standard equipment for vehicles, for example, automobiles. Usually such systems receive GPS (Global Positioning System)— satellite radio signals. These radio signals are received by a GPS antenna of the vehicle and are provided to a navigation computer in the vehicle. This computer processes the received data and furthermore data obtained by motion sensors, as wheel sensors and gyroscopes, and thus, determines the present position of the vehicle.

Known navigation systems typically use electronic maps to represent cartographic features, as streets, buildings and rivers, and make use of a medium such as a compact disk or a digital video disc to store the data that relates to the cartographic features. After map matching the present position of the user is indicated in the digital map. By acoustic and/or visualized information the user is guided to the predetermined destination.

Some navigation systems are able to display detailed digital maps and/or three-dimensional detailed views indicating routes to predetermined destinations, the types of manoeuvres to be taken at various locations as Junctions as well as different kinds of points of interest (POI) as, for example, gas stations, hotels or restaurants and also landmarks.

In order to provide the navigation functions navigation systems make use of one or more detailed databases that may comprise bitmap images for lanes, sign post information, landmarks etc. and data which, e.g., represent physical features of a geographic region and points of interest.

In principle, a route from a starting point to a destination point can be calculated by an in-vehicle navigation system or externally by some computing center that has more computational power, always updated databases and real-time information, for example, traffic information. If a route for route guidance is calculated at the computing center it has to be encoded and transmitted to the in-vehicle navigation system where it is to be decoded for the actual route guidance, for example, route display. Encoding and decoding are necessary since each execution environment (the in-vehicle navigation system and the computing center) has its own navigation database and will be able to calculate and present routes only that have references to their own navigation database. Moreover, different data formats may be employed in different execution environments. Thus, any communication between the different execution environments has to be based on encoding and decoding of data.

During encoding the calculated route is converted from a database-dependent description to a database-independent description and during decoding the route is converted from a database-independent description to a database-dependent description.

In the art, the processes of encoding and decoding are rather time-consuming, for example, due to expansive attributes of route data needed for the encoding/decoding and detailed road network descriptions included in the navigation databases used for the route finding process. In particular, in the case of long-distance routes the decoding of received encoded routes result in a high computational load on in-vehicle navigation systems and large time delays between a request for route guidance and the presentation of an externally calculated route.

It is therefore a problem underlying the present invention to provide route guidance and, in particular, encoding and decoding of routes, that is less time consuming as in the art but allows for a reliable communication of route data from one execution environment to another.

DESCRIPTION OF THE INVENTION

The following presents a simplified summary of the invention in order to provide a basic understanding of some aspects of the invention. This summary is not an exhaustive overview of the invention. Its sole purpose is to present some concepts in a simplified form as a prelude to the more detailed description that is discussed later.

The above-mentioned problem is solved by a method of providing a route calculated from road data (stored in a navigation database) including road segments (it is noted that herein the terms "road" and "street" are used interchangeably). A road is constituted by its road segments as known in the art. It is provided a computer-implemented method of providing a route to a navigation system (for example, an in-vehicle navigation system) that comprises the steps of calculating the route from road data (for example, stored in a navigation database of a computing center) including road segments, determining decision points on the route, wherein at least two road segments are connected to each other at each of the decision points, storing data of the determined decision points (for example, temporarily in a RAM or on a memory disc) and encoding the route based on the stored data of the determined decision points. The data may be generated or read before it is stored. This method of encoding does not include storing/encoding of individual road segments but only storing/encoding data of decision points. It is merely necessary to encode the data of the decision points in order to provide for an encoded route. Thereby, the memory demand and overall computational load can be drastically reduced as compared to the art.

The encoding process may be performed at a computing center that is external to a vehicle. After encoding a calculated route needed for route guidance by a navigation system installed in the vehicle the encoded route may be transmitted to the navigation system of the vehicle where it is decoded. The decoded route can be presented to a user of the vehicle, for example, it can be displayed on a screen of the in-vehicle navigation system. The calculation of the route at the computing center may be initiated by a user of the in-vehicle navigation system. Both the computing center and the in-vehicle navigation system may have their own navigation databases storing roads and road segments. Both databases the one of the computing center and the one of the in-vehicle navigation system may store the same roads/road segments or subsets of roads/road segments. Both databases may store hierarchically ranked roads and thereby ranked road segments (confer description below).

It is essential to determine decision points. Determining decision points may comprise reading location data of locations where different roads intersect. According to an example, determining the decision points comprises identifying all decision points of the route and ignoring those decision points at which only two road segments connect to each other. Thereby, the demand for memory spaced and computational resources needed for the encoding and decoding can be further reduced.

The roads and road segments constituting the roads stored in databases of the computing center and the in-vehicle navigation system, for example, can be hierarchically classified in ranks and determining the decision points comprises identifying all decision points of the route and ignoring those decision points at which two road segments of the route connect to each other and at which only additional road segments (additional to road segments being part of the route) are connected that are of a lower rank as compared to the two road segments of the route. Ignoring particular decision points means that the ignored decision points are not used for the encoding/decoding of routes. The ranking may be performed based on the importance of the roads in terms of highways, main roads, urban roads, rural roads, cross-country roads, secondary roads, etc. The rank of a road segment can be defined by the rank of the roads to which it belongs.

In general, the inventive method is particularly useful and time and computational load saving for relatively long routes to be traveled, for example, routes with lengths of more than 50 km, 100 km or 200 km. The above-described example that makes use of hierarchically classified roads may be used for a middle portion of a relatively long route only, for example, for a middle portion of the route comprising 30% or 40% or 50% to 60% or 70% or 80% of the entire route. Thus, according to an embodiment the route comprises a start portion (comprising a starting point of the route, for example, an actual position of the in-vehicle navigation system), a middle portion and an end portion (comprising a destination point of the route) and the road segments are hierarchically classified in ranks and wherein determining the decision points comprises identifying all decision points of the route and, for the middle portion of the route only, ignoring those decision points at which only additional road segments are connected that are of a lower rank as compared to the two road segments of the route.

Particular kinds of data of the determined decision points have proven to be suitable for a reliable route guidance based on the accordingly encoded/decoded routes. For example, storing the data of a decision point of the determined decision points may comprise storing at least one of geo-coordinates of the decision point, a geo-direction of a road segment entering the decision point, a geo-direction of a road segment leaving the decision point, type of a road a road segment of which enters the decision point, type of a road a road segment of which leaves the decision point and on-route distance (distance along the route) from the decision point to a previous decision point of the route or a subsequent decision point of the route. In this example, this kind of data is used for encoding the route.

As already mentioned the method for providing a route may include transmitting the encoded route from a computing center to an in-vehicle navigation system, receiving the transmitted encoded route at the in-vehicle navigation system and decoding the received encoded route at the in-vehicle navigation system. During decoding the following procedure has proven to be very efficient. A first decision point on the route starting from a pre-determined starting point is matched to the road network stored in a navigation database by determining all road segments of the road network which match the information associated with that decision point. For example, the coordinates of the decision point should be close to the geometry of the road segments under consideration, the geo-direction of the road segment leaving from a decision point should be similar to the geo-direction associated with leaving the decision point stored for the decision point, etc.

Using the thus determined road segments as a start set, a road network expansion is started. The network expansion may start from a pre-determined starting point of a route and iteratively road segments are considered that are subsequent to known road segments thereby expanding the road network until a pre-determined destination point of the route is reached. Transitions from one road segment to a subsequent one might be characterized by appropriate cost functions.

For example, the network expansion can be performed based on a Dijkstra or A* algorithm or a similar algorithm known in the art and possible constraints associated with the decision points may have to be observed (e.g., the constraint of the rank of the road segment), and wherein each expanded road segment is associated with the predecessing road segment through which it was reached (as is a common technique for Dijkstra or A*). As soon as the road network expansion traverses a junction, which fulfills the properties of the next decision point, the road network expansion is terminated at the road segment which leaves the junction. By backtracking through the sequence of predecessors, the current stretch of the decoded route is determined. The road segment which leaves the junction is then used to start a road network expansion to the next decision point (similar to the previous expansion), etc., until the final decision point closest to pre-determined destination point is reached.

Note that the road network expansion is only the expansion of the decoded route (path) and of no other road segment, if the information associated with the decision points is sufficient to uniquely determine the road segments on the decoded route and the encoder and decoder databases (databases of a computing center and an in-vehicle navigation system, for example) match sufficiently well (e.g., by using the same rank definition). This makes the proposed technique very efficient, as only the first decision point has to be matched to the road network (which might be an expensive computational operation), and the remaining decision points are matched on the fly during the road network expansion (which comes at almost no computational cost).

If the next decision point cannot be reliably identified during one of the road network expansions, several possibilities occur: (1) the decoding fails, (2) the expansion is repeated with relaxed parameters, (3) the next decision point is actively matched to the road network and the road network expansion is executed in reverse direction, and (4) combinations of options (1) to (3).

In particular, road networks of navigation databases are usually stored in several thinned-out and aggregated versions to speed up long-distance route calculations. For example, there is one version containing ail roads and there is another version only containing major roads, where ail junctions to minor roads have been removed, etc. One definition of this can be found in the Navigation Data Standard NDS, http://www.nds-association.org/. If the rank $r_{\{k\}}$ is associated with the k-th part of the encoded route, and a higher rank means a more important road (and a greater thin-out of the associated network version), then the k-th part of the encoded route can be decoded on the network version associated with $\min(r_{\{k-1\}}, r_{\{k\}}, r_{\{k+1\}})$. This leads to another significant speed-up of the decoding of the route.

Furthermore, it is provided a computer program product, comprising one or more computer readable media having computer-executable instructions for performing the steps of the method according to one of the above-described examples.

The above-mentioned problem is also addressed by the herein disclosed in-vehicle navigation system that may comprise its own navigation database configured for storing roads, communication means configured for exchanging data with an external computing center (for example, via the Internet or a mobile network), a data processor configured to decode an encoded route that is encoded and transmitted by the external computing center in order to obtain a decoded route and a display device configured for displaying the decoded route. The data processor is configured for decoding the encoded route based on data of decision points of the route included in the encoded route. The above description of the characteristics of the decision points holds. At least two road segments are connected to each decision point. The route is calculated by the external computing center from road data comprising road segments and stored in a computing center database. Both the navigation database of the in-vehicle navigation system and the computing center database stored representations of roads. The kinds of representation, for example, in terms of the data format and accuracy, may be different.

As described above with reference to an embodiment of the inventive method, the data of the decision points encoded by the computing center may include at least one of geo-coordinates of the decision point, a geo-direction of a road segment entering the decision point, a geo-direction of a road segment leaving the decision point, type of a road segment of which enters the decision point, type of a road a road segment of which leaves the decision point, and on-route distance from the decision point to a previous decision point of the route or a subsequent decision point of the route.

Furthermore it is provided a navigation system comprising an in-vehicle navigation system according to one of the above-described examples and a computing center external to the in-vehicle navigation system. The computing center comprises a computing center database and a data processor configured for calculating a route based on data stored in the computing center database, encoding the calculated route based on data of decision points of the route and transmitting the encoded route to the in-vehicle navigation system. The in-vehicle navigation system, according to an embodiment of this navigation system, comprises a navigation database configured for storing roads and the computing center database and the navigation database of the in-vehicle navigation system may store the same road segments of the route (though possibly in different data formats).

Additional features and advantages of the present invention will be described with reference to the drawings. In the description, reference is made to the accompanying figures that are meant to illustrate preferred embodiments of the invention. It is understood that such embodiments do not represent the full scope of the invention.

While the present disclosure is described with reference to the embodiments as illustrated in the following detailed description as well as in the drawings, it should be understood that the following detailed description as welt as the drawings are not intended to limit the subject matter to the particular illustrative embodiments disclosed, but rather the described illustrative embodiments merely exemplify the various aspects, the scope of which is defined by the appended claims.

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The following embodiments are described in sufficient detail to enable those skilled in the art to make use of the invention. It is to be understood that other embodiments would be evident, based on the present disclosure, and that system, structure, process or mechanical changes may be made without departing from the scope of the present disclosure. In the following description, numeral-specific details are given to provide a thorough understanding of the disclosure. However, it would be apparent that the embodiments of the disclosure may be practiced without the specific details. In order to avoid obscuring the present disclosure, some well-known circuits, system configurations, structure configurations and process steps are not disclosed in detail.

The present disclosure will now be described with reference to the attached figures. Various structures, systems and devices are schematically depicted in the drawings for purposes of explanation only and so as to not obscure the present disclosure with details which are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary or customary meaning as understood by those skilled in the art, is intended to be implied by consistent usage of the term or phrase herein. To the extent that a term or phrase is intended to have a special meaning, i.e., a meaning other than that understood by skilled artisans, such a special definition shall be expressively set forth in the specification in a definitional manner that directly and unequivocally provides the special definition for the term or phrase.

Figure 1:
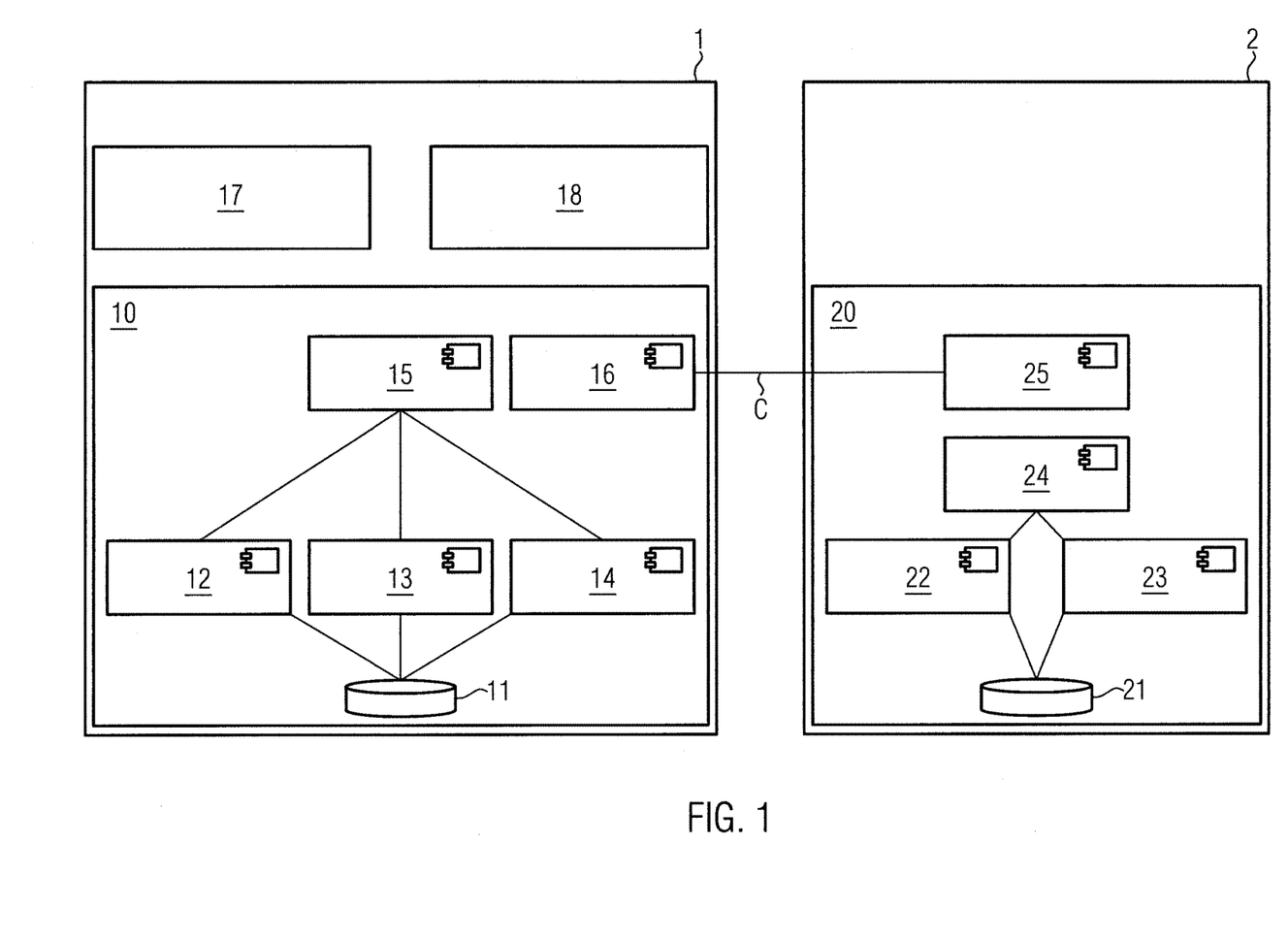
FIG. 1 shows components of a navigation system comprising an in-vehicle navigation system and a computing center.

A navigation system in accordance with the present invention is illustrated in FIG. 1. The navigation system comprises an in-vehicle navigation system 1 and an external computing center 2. The in-vehicle navigation system 1 and the external computing center 2 can communicate with each other via a data channel C. The data channel may be realized by the Internet or a mobile network. The in-vehicle navigation system 1 comprises a computing device (data processing device) 10 including a data processor and volatile and non-volatile memories. The computing device 10 comprises a navigation database 11 wherein road data is stored. The navigation database 11 may also store data on points-of-interest and graphical objects. Further, the computing device 10 comprises a route decoder 12, a route display generator 13 for calculating route points of a displayed route and a route guidance generator 14 for generating route guidance instructions as well as a route calculation controller 15 and a communication controller 16. The computing device 10 may also include a route calculator (not shown in FIG. 1) for calculating a route.

The in-vehicle navigation system 1, additionally, includes a display device 17 and an operator control 18. The display device 17 can be used for route guidance and the operator control 18 can be used for user inputs. The route display controller 13 and route guidance controller 14 are in data communication with the navigation database 11 and the route calculation controller 15 and they are configured to control route display and guidance, respectively. In response to an appropriate input by user via the operator control 18 the route calculation controller 15 initiates communication between the communication controller 16 of the in-vehicle navigation system 1 and the communication controller 25 of the external computing center 2.

The computing center 2 comprises a computing device 20. The computing device 20 of the computing center database 21 comprises a route calculator 22, a route encoder 23, a route calculation controller 24 and a communication controller 25. Both databases 11 and 21 stored road data, in particular, data on the same roads, but possibly in different formats and different resolutions and details, etc. Based on data received from the communication controller 25 the route calculation controller 24 initiates route calculation by the route calculator 22. The route calculator 22 calculates a route from a pre-determined starting point to a pre-determined destination (input by the user of the in-vehicle navigation system 1) by means of navigation data stored in the database 21 of the computing device 20 of the computing center 2. The calculated route is encoded by the route encoder 23 and the encoded route is transmitted to the in-vehicle navigation system 1 for decoding by the route decoder 12 and route guidance.

Figure 2:
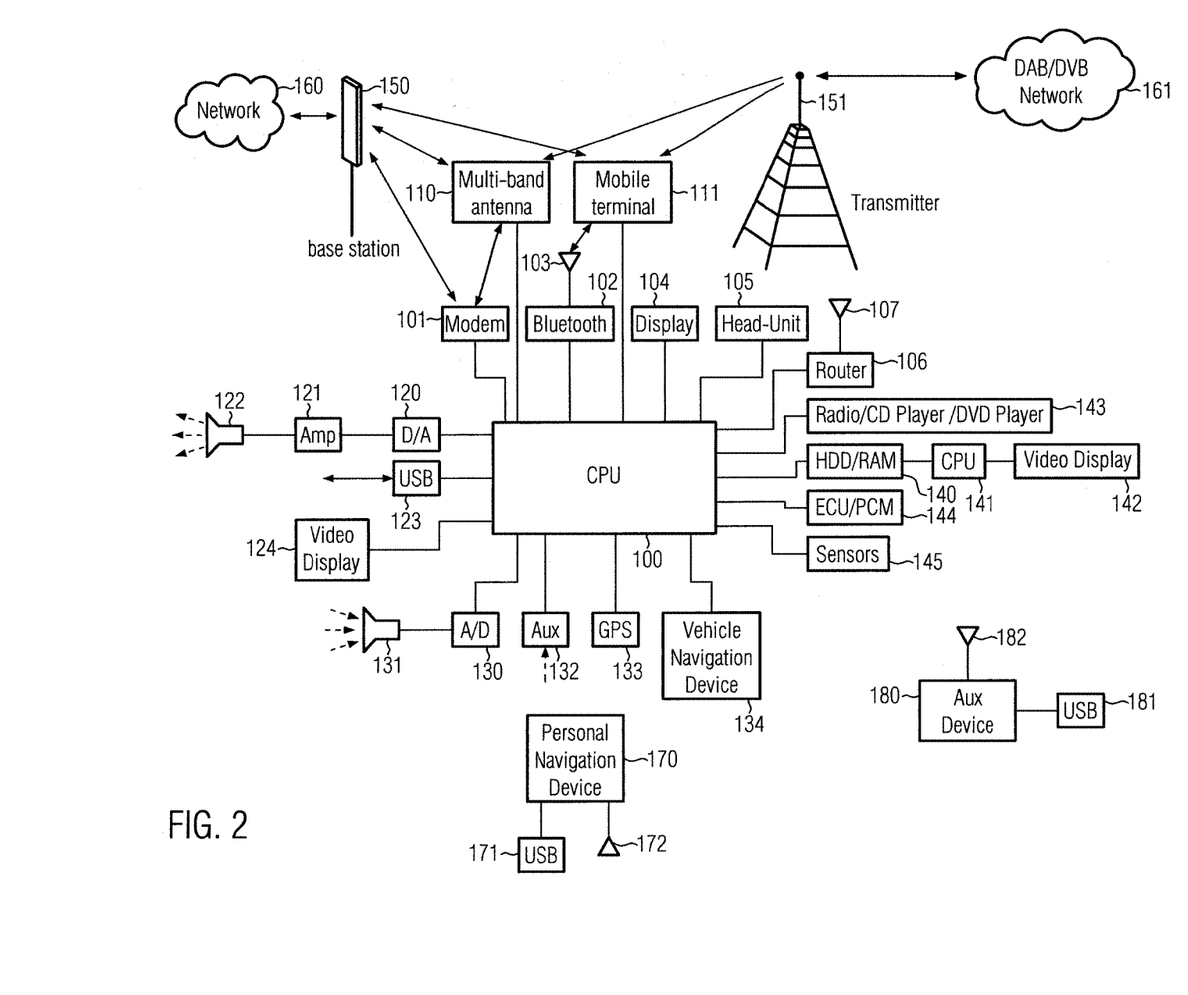
FIG. 2 shows a telematics system wherein the in-vehicle navigation system may be integrated.

The in-vehicle navigation system 1 can be integrated in a larger automotive telematic system as shown in FIG. 2.

Components 100 to 145 and 170 to 182 are installed in a vehicle, while components 150 to 181 are external components which are not part of the automotive telematic system but may interact with some of the telematic components of the vehicle.

A vehicle equipped with a telematic system may contain a display 104 (which might be identical with the display device 17 shown in FIG. 1), as a visual front end interface located in the vehicle. The user may also be able to interact with the interface via a touch sensitive screen, via pressing a button, via audible speech and speech synthesis, or other HMI (Human-Machine-Interaction) components known in the art. Interaction via audible speech and speech synthesis or analysis may be via a microphone 131 and an A/D converter 130 for receiving input from the user and via a D/A converter 120, an amplifier 121, and one or several speakers 122 for giving output to the user. The visual front end interface may be part of a head-unit for a centralized interaction of the user with the telematic system or separate from one or more dedicated head-units 105, e.g., for interaction of the user with audio or telephony components of the telematic system.

In the illustrative embodiment shown in FIG. 2, a central processing unit 100, typically a CPU or GPU or an embedded system, controls at least a portion of the operation of the telematic system. However, the current invention is not limited to this, but may provide at least one further processing unit assigned to a specific telematic component or a group of telematic components, as for instance a CPU 141 provided with a video display 142, possibly as part of a rear seat entertainment system for displaying movies from a storage device, like a hard disk drive 140. The processing unit allows on-board processing of instructions, commands, and routines, particularly as part of an application component of the telematic system. The processing unit 100 may further be connected to both non-persistent and persistent storage devices 140. In this illustrative embodiment, the non-persistent storage device is random access memory (RAM) and the persistent storage device is a hard disk drive (HDD) or flash memory.

The processing unit 100 may also be provided with a number of different inputs allowing the user to interface with the processing unit. In this illustrative embodiment, a microphone 131, an auxiliary input 132, a USB input 123, a GPS input 133, and a Bluetooth input 102 are all provided. An input selector may be provided to allow the user to swap between various inputs. Input to the microphone 131 is converted from analog to digital by an A/D converter 130 before being passed to the processing unit.

Outputs from the telematic system may include, but are not limited to, a video display 124 and a speaker 122 or stereo/surround system output. The speaker may be connected to an amplifier 121 and may receive its signal from the processing unit 100 through a digital-to-analog converter 120. Output can also be made via the Bluetooth transceiver 102 with a Bluetooth antenna 103 to a remote Bluetooth device such as a personal navigation device 170 with a Bluetooth antenna 172. Communication with a personal navigation device can also be achieved via USB connectors 123 and 171. The telematic system may further comprise a navigation device 134, in particular, the in-vehicle navigation system 1 illustrated in FIG. 2. The navigation device 134 may interact with the GPS unit 133 and/or a mobile network 160 (provider network) via a base station 150 and a multi-band antenna 110 or a mobile terminal 111. It should be noted, however, that according to an example of the inventive terminal system and method for controlling the same, the processing unit has not own access to a provider network but rather wireless data connection to the provider network is merely offered by wirelessly connected or fixedly installed network access devices (NADs).

The mobile terminal 111, being an example for an NAD, may particularly be a cell phone, smart phone, PDA, or the like and may be connected to the processing unit 100 either directly, via a USB connector 123, or via the Bluetooth transceiver 102 with its antenna 103. The multi-band antenna 110 may exchange data with the processing unit 100 either through a wire or wirelessly through a modem 101. Here, the base station 150 and the network 160 are not part of the telematic system but provided outside the vehicle. In some embodiment, the base station 150 may be a WiFi access point. In fact, the computing center 2 of FIG. 1 may communicate with the navigations system of the vehicle 1 of FIG. 1 (see reference sign 134 of FIG. 2) via the network 160.

Data may be communicated between the central processing unit 100 and the network 160 utilizing, for instance, a data-plan, data over voice, or DTMF tones associated with the mobile terminal. Both multi-band antenna 110 and the mobile terminal 111 may exchange data bi-directionally with the base station or WiFi access point 150. The modem 101 may also communicate directly with a network 160 through communications with a cellular tower 150. As a non-limiting example, the modem 101 may be a USB cellular modem and the communication may be cellular communication.

In one illustrative embodiment, the processing unit 100 is provided with an operating system including an API to communicate with modem application software. The modem application software may access an embedded module or firmware on the Bluetooth transceiver 102 to complete wireless communication with a remote Bluetooth transceiver (such as that of the mobile terminal 111). In another embodiment, the mobile terminal 111 may include a modem for voice band or broadband data communication. If the user has a data-plan associated with the mobile terminal 111, it is possible that the data-plan allows for broadband transmission and the telematic system could use a much wider bandwidth (speeding up data transfer). In still another embodiment, the mobile terminal 111 may be replaced with a cellular communication device (e.g., and without limitation, a modem 101), that is installed in the vehicle. In yet another embodiment, the mobile terminal 111 may be replaced with a wireless local area network (LAN) device capable of communication over, for example, an 802.11g network (i.e., WiFi) or a WiMax network. In one embodiment, incoming data can be passed through the mobile terminal 111 via a data-over-voice or data-plan, through the on-board Bluetooth transceiver 102 and into the central processing unit 100.

Data, whether incoming or outgoing or temporary, may be stored on the HDD 140 or in the RAM 140 or any other storage media until such time as the data is no longer needed. The HDD 140 or other storage media may in particular be used as the memory for storing generated log files until the reporter component transmits them to an external analyzer component. This transfer to an external analyzer component may be performed via the modem 101, the multi-band antenna 110, the Bluetooth transceiver 102, or the mobile terminal 111, e.g., to a mobile network 160 or a wireless network.

The central processing unit may further be in communication with a variety of other auxiliary devices 180. These devices can be connected through wireless 182 or wired 181 connections (such as a USB connection). Also, or alternatively, the CPU 100 may be connected to a vehicle based wireless router 106, using for example a WiFi transceiver 107. This could allow the CPU to connect to remote networks in range of the local router 106.

The processing unit 100 may further interact with a radio, a CD player, or a DVD player 143 to provide audio and/or video to the stereo system 122 and/or a video display 142. Audio and/or video may also be provided via the multi-band antenna 110 or the mobile terminal 111 from a mobile network 160, wireless network, or digital broadcast provider network 161 (Digital Audio Broadcast, Digital Video Broadcast) via a broadcast transmitter 151 outside the vehicle. Audio and video data may be downloaded or streamed through the above described connections. In the case of a download, the data may be temporarily or persistently stored in the HDD 140 or other storage device. A further processing unit 141 may later read the stored data from the HDD 140 and provide video and/or audio service through the vehicle's speaker system 122 or a video display 142.

The processing unit 100 may further interact with a microphone 131 and the vehicle's speaker system 122 to provide hands-free telephony, e.g., via the mobile terminal 111. Similarly the processing unit 100 may interact with the mobile terminal 111 and vehicle diagnostics (not shown) to send an emergency call or a breakdown call (see further below).

The processing unit 100 may also interact with an engine control unit (ECU) 144 to control engine parameters or monitor the vehicle's engine. Similarly, the processing unit 100 may interact with a powertrain control module (PCM) 144 and a series of sensor systems 145, like for instance but without limitation, a tire pressure monitoring system, a road condition sensor, a parking sensor, a temperature sensor, an ambient light sensor, and the like. Wired communications within the automotive telematic system may be carried out using MOST (Media Oriented Systems Transport), CAN (Controller Area Network), IEEE 1394, or other technologies known in the art.

As described above the in-vehicle navigation system 1 can be operated in the framework of a larger telematics system that might be connected to a computing center 2 as shown in FIG. 1. In the following operation of the in-vehicle navigation system 1 and the computing center 2 shown in FIG. 1 is described with reference to FIG. 3. As an initial step a user of the in-vehicle navigation system 1 makes use of the operator control 18 of the in-vehicle navigation system 1 in order to request calculation of a route to a destination input by the user 50, wherein the calculation should be performed by the external computing center 2 rather than the in-vehicle navigation system 1 itself. A reason for the decision of the user to have the computing center 2 calculate the route may be the more powerful computational resources available at the computing center 2 or the desire to have access to more up-dated navigation data and/or current information on traffic conditions. Upon request by the user communication to the computing center 2 (CC) is triggered 51. For example, the route calculation controller 15 of the in-vehicle navigation system 1 (IVND) triggers the communication controller 18 to transmit a request for calculation and provision of a route to the destination to the communication controller 25 of the computing center 2, i.e., the communication controller 16 of the IVND queries a route from the communication controller 25 of the CC 52.

Figure 3:
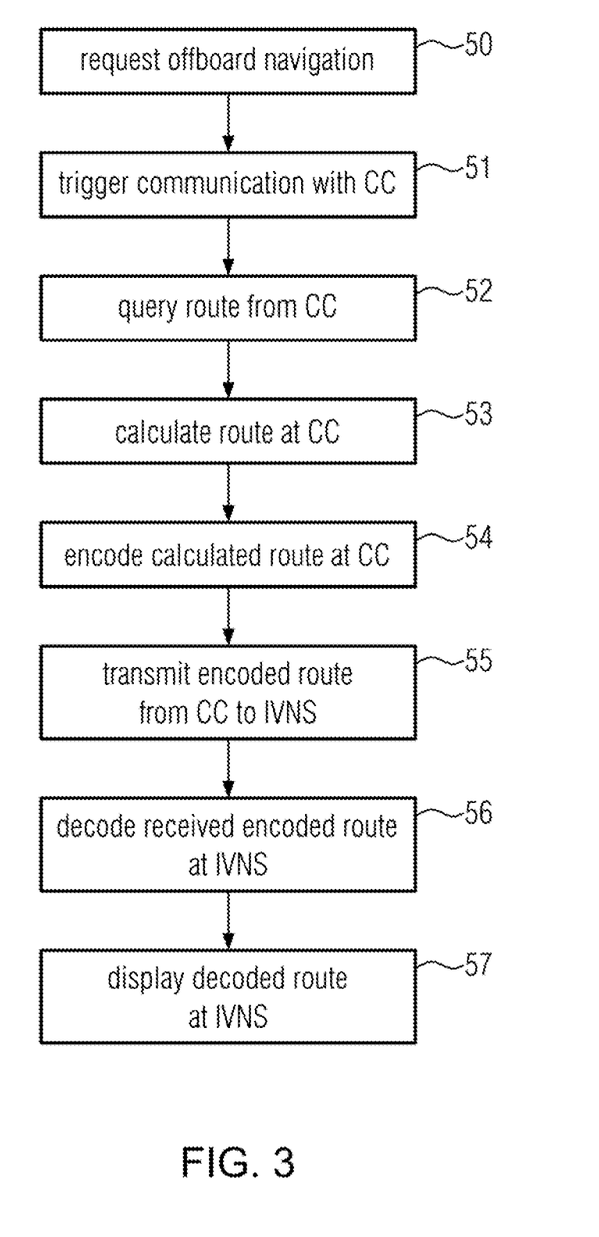
FIG. 3 shows a flow diagram of the operation of the navigation system shown in FIG. 1

Upon request a route is calculated at the CC 53. For example, the communication controller 25 of the CC triggers the route calculation controller 24 of the CC that in turn initiates route calculation 53 by the route calculator 22 and encoding 54 of the calculated route by means of the route encoder 23. The encoded route is transmitted form the CC to the IVNS 55. For example, the route calculation controller 24 of the CC receives the encoded route from the route encoder 23 and provides the communication controller 25 of the CC with this encoded route. Subsequently, the communication controller 25 of the CC transmits the encoded route to the communication controller 16 of the IVNS that in turns provides the route calculation controller 15 of the IVNS with the received encoded route. The encoded route is decoded 56 by the route decoder 12 in order to match if with the particular navigation data (format) of the navigation database 11 of the IVNS. The route display controller then initiates display of the decoded route on the display device 17.

Encoding and decoding are necessary in order to allow the in-vehicle navigation system 1 to use a route calculated by a different system (i.e., the computing center) that generally employs different data concepts and formats than the in-vehicle navigation system 1 itself. The coded data transmitted by the computing center 2 can be decoded in order to fit to the software applications and navigation data of the in-vehicle navigation system 1. According to the invention, the encoded data represents decision points of the route rather than all or some road segments constituting the route. A decision point (of a route) is defined in that at least two road segments are connected at each at the decision point.

In other words, an encoded route comprises data of decision points only as, for example, the geo-locations (gee-coordinates) of the decision points determined before encoding the route. Data of decision points do not include data representing road segments but may include data referring to road segments. For example, the data of a decision point may include a geo-direction of a road segment entering the decision point and/or a geo-direction of a road segment leaving the decision point. Moreover, the data of a decision point used for the encoding of a route may include the type of a road a road segment of which enters the decision point and/or the type of a road a road segment of which leaves the decision point and. Furthermore, the data of a decision point used for the encoding of a route may include the on-route distance from the decision point to a previous decision point of the route and/or a subsequent decision point of the route.

Figure 4:
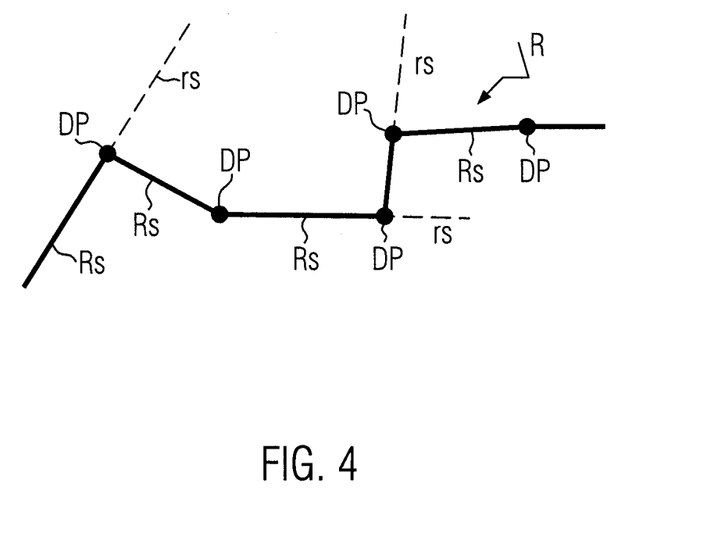
FIG. 4 illustrates the concept of road segments and decision points.

Encoded route data representing decision points only (and no road segments) allows for significantly reducing the memory demand and computational load particularly at the side of the in-vehicle navigation system 1. FIG. 4 shows a route R (solid line) that might be calculated be the route calculator 22 of the computing center 1. The route is constituted by road segments RS of roads stored in the computing center database 21. The roads involved in the route finding also comprise road segments rs (dashed lines) that are not part of the route R.

The road segments RS constituting the route R are connected at decision points DP. For each decision point DP shown in FIG. 4 one road segment RS reaching the decision point (for example, the left-most road segment) DP and one road segment RS leaving the decision point DP (for example, the right-most road segment) can be identified. Data of the decision points DP can be stored and transmitted in encoded form from the computing center 2 where the route R is calculated to the in-vehicle navigation system 1 where a route for route guidance is needed. Based on the stored decision points DP that become available for the route guidance controller 14 after decoding by the route decoder 12 a route can be displayed to a user of the in-vehicle navigation system 1 based on the decision points DP determined by the computing device 20 of the computing center 2.

Figure 5:
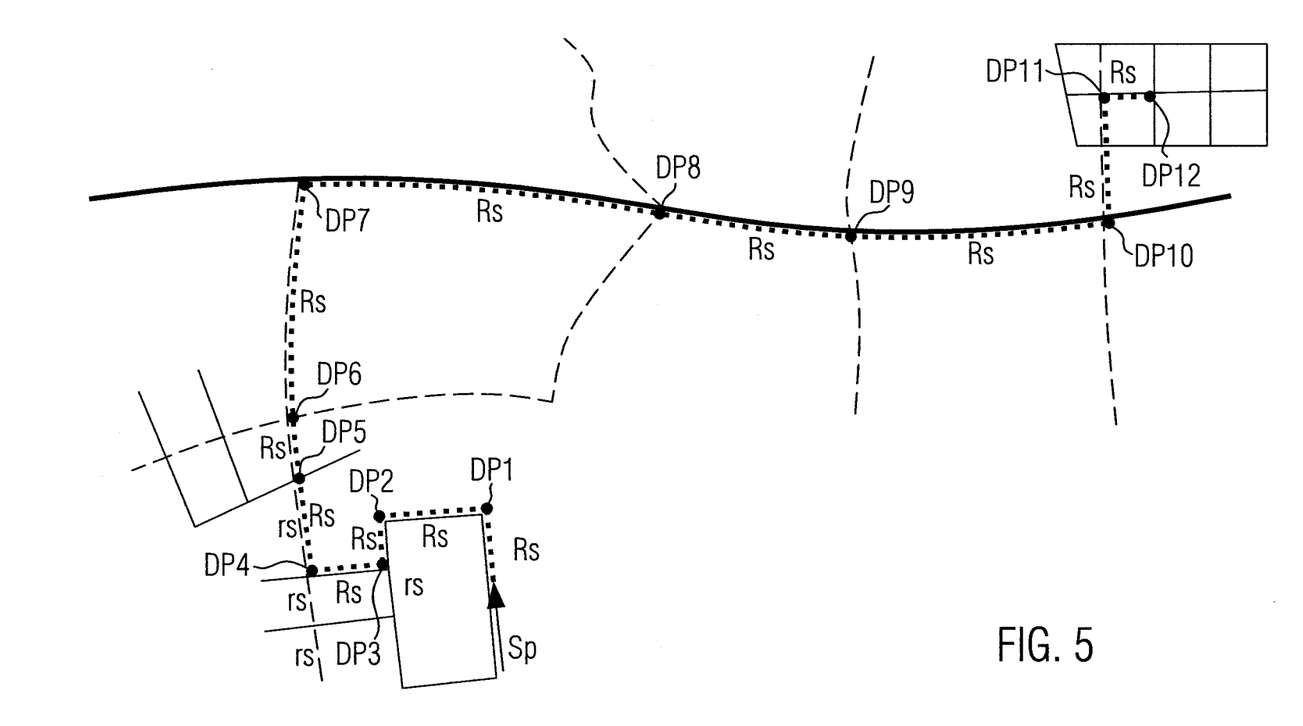
FIG. 5 illustrates a route represented by particularly selected decision points.

According to another embodiment the overall processing can be further accelerated and computational load can be further reduced by selecting particular decision points only for the encoded route data. FIG. 5 illustrates a procedure of determining decision points for encoding a route including ignoring particular kinds of decision points. This procedure can be applied if the roads (and thereby road segments constituting the roads) stored in the computing center database 21 and the navigation database 11 of the in-vehicle navigation system 1 are hierarchically ranked. Hierarchic ranking can be done based on the importance of the roads, for example. The importance can be measured by the categories of the roads (highways, main roads, urban roads, rural roads, cross-country roads, secondary roads, etc.). FIG. 5 shows road segments or roads of major importance (for example, highways), medium importance (for example, main streets) and minor importance (for example, secondary roads).

The starting point SP of the calculated route R lies on road of minor importance. A road segment RS reaches the first decision point DP1 and another road segment leaves the first decision point DP1 and reaches the second decision point DP2 from which a further RS is leaving that reaches a third decision point DP3. The terms "leaving" and "reaching" refer to the direction in which the route is to be traveled. At the decision points DP1 and DP2 there are only two road segments connected to each other. Obviously, these decision points can be ignored and are not required for encoding the route.

Contrarily, decision point DP3 is needed for encoding the route since a road segment rs of the same importance (rank) as the road segment RS of the route connecting decision points DP3 and DP4 that is not part of the route is connected to the decision point DP3. Information must be given that a right-turn has to be made in order to follow the route. Thus, decision point DP3 has to be included in the encoded route data. The same holds for decision point D4 where two road segments rs not being part of the route and two other road segments RS being part of the route are connected to each other. Information must be given to make a right turn at decision point DP4 to enter a road of medium importance. Similarly decision points DP6, DP7, D10, D11 and D12 have to be determined to be taken into account for encoding the route R. For example, at decision point DP7 information has to be given to make right turn to enter a road of major importance.

On the other hand, according to the illustrated example decision points DP5, DP8 and DP9 can be ignored. At each of these decision points only one road segment RS of the same rank/importance as the respective road segment RS reaching the decision points is present (namely a road segment of the route) whereas other road segments rs connected to these decision points are parts of roads of lower rank/importance which are ignored.

The procedure described with reference to FIG. 5 may be performed for a middle portion or a route only the middle portion connecting a start portion comprising a starting point and an end portion comprising a destination point of the route. For example, it may be performed only for a middle portion of 10% to 90%, in particular, 30% to 70% or 40% to 80%, of the entire route ranging from a starting point (for example, corresponding to an actual position of the in-vehicle navigation system) to a destination point that might be input by a user of the in-vehicle navigation system. The middle portion may cover some 10 km to some 100 km of travel in real space, for example.

The particular embodiments disclosed above are illustrative only, as the invention may be modified and practiced in different but equivalent manners apparent to those skilled in the art having the benefit of the teachings herein. The exemplary methods and steps comprised therein can be combined in any appropriate manner.

The invention claimed is:

1. A method of providing a route to a navigation system, comprising the steps of:
    calculating a route from a pre-determined starting point to a pre-determined destination point, the route is calculated from road data stored in a database including road segments that are hierarchically classified in ranks;
    determining decision points on the route, wherein at least two road segments are connected to each other at each of the decision points;
    the step of determining decision points further comprises, identifying all decision points of the route and ignoring those decision points at which two road segments of the route connect to each other and which only additional road segments are connected that are of a lower rank as compared to the rank of the two road segments of the route;
storing data of the determined decision points in a memory;
encoding the route based on the stored data of the determined decision points;
transmitting the encoded route from a computing center to the navigation system;
receiving the transmitted encoded route at the navigation system
decoding the encoded route at the navigation system; and
presenting the decoded route on a display of the navigation system.

2. The method according to claim 1, wherein determining the decision points comprises identifying all decision points of the route and ignoring those decision points at which only two road segments connect to each other.

3. The method according to claim 1, wherein the route comprises a start portion, a middle portion and an end portion and wherein determining the decision points comprises identifying all decision points of the route and, for the middle portion of the route only, ignoring those decision points at which only additional road segments are connected that are of a lower rank as compared to the two road segments of the route.

4. The method according to claim 1, wherein storing the data of a decision point of the determined decision points comprises storing at least one of:
geo-coordinates of the decision point,
a geo-direction of a road segment entering the decision point,
a geo-direction of a road segment leaving the decision point,
type of a road a road segment of which enters the decision point,
type of a road a road segment of which leaves the decision point, and
on-route distance from the decision point to a previous decision point of the route or a subsequent decision point of the route.

5. The method according to claim 3, wherein storing the data of a decision point of the determined decision points comprises:
storing the rank of one or more roads by which the decision point is reached from a previous decision point; or
storing the rank of one or more roads on which a subsequent decision point is reached from the decision point: or
storing the rank of one or more roads by which the decision point is reached from a previous decision and the rank of one or more roads on which a subsequent decision point is reached from the decision point.

6. The method according to claim 1, wherein presenting the decoded route to a user of the in-vehicle navigation system further comprises displaying the route on a screen of the in-vehicle navigation system.

7. The method according to claim 6, further comprising transmitting a request to calculate a route from the in-vehicle navigation system to the computing center in response to an input by the user and calculating the route by the computing center.

8. The method according to claim 1, wherein decoding the received encoded route at the in-vehicle navigation system comprises matching a first decision point on the route starting from a pre-determined starting point of the route to a road network stored in a navigation database of the in-vehicle navigation system by determining all road segments of the road network with the information associated with the first decision point;
starting a road network expansion starting from the determined road segments;
associating each expanded road segment with a precedent road segment through which it was reached; and
if the road network expansion traverses a junction that fulfills the properties of a next decision point of the route following the first decision point, terminating the road network expansion at a road segment that leaves the junction and starting a new road network expansion from the road segment that leaves the junction.

9. A computer program product, comprising one or more non-transitory computer readable media having computer-executable instructions for performing the steps of:
calculating a route from a pre-determined starting point to a pre-determined destination point, the route is calculated from road data stored in a database including road segments that are hierarchically classified in ranks;
determining decision points on the route, wherein at least two road segments are connected to each other at each of the decision points;
the step of determining decision points further comprises, identifying all decision points of the route and ignoring those decision points at which two road segments of the route connect to each other and at which only additional road segments are connected that are of a lower rank as compared to the rank of the two road segments of the route;
storing data of the determined decision points in a memory;
encoding the route based on the stored data of the determined decision points; and
presenting the route on a display.

10. An in-vehicle navigation system, comprising
communication means configured for exchanging data with an external computing center the computing center having a computing center database configured for storing roads and a data processor configured for calculating a route from a pre-determined starting point to a pre-determined destination point based on the road data stored in the computing center database, encoding the calculated route based on data of decision points of the route;
a data processor configured to decode an encoded route that is encoded and transmitted by the external computing center in order to obtain a decoded route the data processor is configured for decoding the encoded route based on data of decision points of the route included in the encoded route, wherein at least two road segments of the route are connected to each other at each of the decision points, the road segments are hierarchically classified in ranks, the data processor is configured for identifying all decision points of the route and ignoring those decision points at which two road segments of the route connect to each other and at which only additional road segments are connected that are of a lower rank as compared to the rank of the two road segments of the route; and;
a display device configured for displaying the decoded route.

11. The in-vehicle navigation system according to claim 10, wherein the data of the decision points includes at least one of:
  geo-coordinates of the decision point,
  a geo-direction of a road segment entering the decision point,
  a geo-direction of a road segment leaving the decision point,
  type of a road a road segment of which enters the decision point,
  type of a road a road segment of which leaves the decision point, and
  on-route distance from the decision point to a previous decision point of the route or a subsequent decision point of the route.

12. The in-vehicle navigation system according to claim 10 wherein the in-vehicle navigation system further comprises a navigation database configured for storing roads and wherein the computing center database and the navigation database of the in-vehicle navigation system store the same road segments of the route.

\* \* \* \* \*